US007068380B2

(12) United States Patent
Milton et al.

(10) Patent No.: US 7,068,380 B2
(45) Date of Patent: Jun. 27, 2006

(54) PRINT MEDIA CATALOG SERVICE

(75) Inventors: Victoria E. Milton, Woodinville, WA (US); Michael Stokes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 958 days.

(21) Appl. No.: 10/036,920

(22) Filed: Dec. 21, 2001

(65) Prior Publication Data

US 2003/0117639 A1     Jun. 26, 2003

(51) Int. Cl.
G06F 3/12     (2006.01)
G06F 15/00    (2006.01)

(52) U.S. Cl. ................... 358/1.13; 358/1.15; 358/3.23

(58) Field of Classification Search ............... 358/1.13, 358/1.15, 1.9, 3.23, 504, 518, 529; 399/45; 382/162, 167
See application file for complete search history.

(56) References Cited

U.S. PATENT DOCUMENTS

| | | | |
|---|---|---|---|
| 6,353,479 B1 * | 3/2002 | Lubawy et al. | 358/1.13 |
| 6,484,631 B1 * | 11/2002 | Degani et al. | 101/171 |
| 6,574,002 B1 * | 6/2003 | Paczewitz | 358/1.13 |
| 6,731,393 B1 * | 5/2004 | Currans et al. | 358/1.12 |
| 2001/0013004 A1 * | 8/2001 | Haris et al. | 705/1 |
| 2002/0057434 A1 * | 5/2002 | Ohga | 356/406 |
| 2002/0073039 A1 * | 6/2002 | Ogg et al. | 705/60 |
| 2003/0140315 A1 * | 7/2003 | Blumberg et al. | 715/527 |

OTHER PUBLICATIONS

International Color Consortium, *ICC. 1:1998-09 File Format for Color Profiles*, 1998.
Microsoft Corporation, Using ICM 2.0 (available through the MSDN library), Feb. 2001.
Microsoft Corporation, About Image Color Management Version 2.0 (available through the MSDN library), Feb. 2001.
Microsoft Corporation, Hardware Issues for Color Management (available through the MSDN library), Nov. 1998.

(Continued)

*Primary Examiner*—David Moore
*Assistant Examiner*—Dillon Murphy
(74) *Attorney, Agent, or Firm*—Microsoft Corporation

(57) ABSTRACT

An automated utility for obtaining an identification of a new type of media from a user and searching remote databases to locate and retrieve properties of the new media to set appropriate printing parameters, including colorimetric parameters. To print on a new media, the user can enter a common identifier of the new media, or it can be automatically detected by the user's printer. Based on this information, remote databases can be searched to locate properties of the new media. The properties can be used to automatically set up an application or computer to use the new media on an intended printer. In addition, if no color profiles are found of the new media and the user's intended printer, a new color profile can be derived from pre-existing color profiles located in the remote databases. Starting with a similar color profile, a difference in colorimetric properties between the media of the similar color profile and the new media can be used to translate the similar color profile into a new color profile. To derive the new color profile for the new media with the intended printer, the colorimetric properties of the new media are substituted after the rest of the color profile has been translated.

21 Claims, 9 Drawing Sheets

OTHER PUBLICATIONS

Microsoft Corporation, Introduction to Color Management in Microsoft Windows Operating Systems (available through the MSDN library), Nov. 1998.

Microsoft Corporation, Printing Support in Windows 98 (available through the MSDN library), printed from Jul. 2001 edition of the MSDN library.

* cited by examiner

PRINT MEDIA CATALOG SERVICE

TECHNICAL FIELD

This invention relates generally to color management and layout management for output devices and, more particularly, relates to the automatic creation of print layouts and color profiles for print media.

BACKGROUND OF THE INVENTION

The proliferation of digital cameras and scanners has created a need for more accurate and more flexible color printing. A modem digital camera can capture many millions of pixels of information in every image, and the resulting picture can rival professional quality film photography. However, the colors captured by the digital camera and displayed by a computing device must be optimally reproduced onto a print media so that an optimal image can be shared and viewed by others. Optimal images require that an accurate color reproduction workflow is supported as well as optional end user preferences. Moreover, modem color scanners are sold for less than $100, and, as a result of their low price, many households and business have purchased at least one such scanner. In a similar fashion as the digital camera, the colors captured by the scanner and displayed by the computing device must be accurately produced onto a print media for the scanning process to achieve its goal of providing an optimal copy of an original image.

Modem color printers can use a number of different technologies to produce output on print media. A color ink-jet printer uses small droplets of a few base colors, and dithers them in a pattern to produce varying colors. A color laser printer places small dots of toner, also from a few base colors, and dithers them to produce the varying colors.

A dye-sublimation printer can mix base colors in a gaseous form and then transfer the color to print media such that each unit of the image printed can be any of a wide range of colors, and no dithering is required. For this reason dye-sublimation printers often print the most accurate color, but the resolution of the image is limited by the technology. Ink-jet and laser printers can often achieve two to three times the resolution of a dye-sublimation printer.

The various color printing technologies also produce different ranges of color. The range of color that a printer is capable of producing is known as the "device gamut" of that particular printer. While the gamut varies between printers using different printing technologies, the gamut can also vary among printers using the same technology. For example, even slight variances in design among different ink-jet printers can result in different device gamuts. Similarly, whether the ink-jet uses four or six different base colors affects the device gamut. Additionally, the perception of the color in a printed color image can also vary depending upon the color, texture, and other properties of the medium upon which the image was printed. Thus, the device gamut is also influenced by the type of medium being used by the printer.

The device gamut is an important consideration in accurately transferring color images between image capture devices, such as digital cameras and color scanners, image display devices, such as a monitor or projector, and output devices, such as color printers. Because each of these devices has a different device gamut, an image may appear very different on each device, especially if the image contains colors that are outside of the device's gamut.

To facilitate the use of color images, color management techniques have been developed to ensure accurate color representation across an entire range of devices. Such color management techniques attempt to map colors outside of a device's gamut into corresponding colors within the gamut. As an initial step, a color management system must first establish a uniform definition for a color universe. Once the color universe is defined, each device can be assigned a color profile that defines the device's gamut using the previously defined color universe. By maintaining a consistent definition of a color universe, translations can be made between one device's color profile and another device's color profile. Thus, for example, the colors displayed on a monitor can be accurately translated into colors that are printed from a printer. Similarly, a given image can be printed using any number of different printers and different printing technologies, and its appearance will be as similar as possible given the limitations of the printing hardware.

Because a printer's gamut is dependent on many factors, including the characteristics of the print media being used, a new color profile is required for each different type of print media used. For example, an ink jet printer can have a different device gamut, and thus a different color profile, when it prints on plain paper as opposed to printing on glossy paper. Therefore, to ensure accurate color output, the user needs access to the color profile of the user's printer when printing on the particular media the user wishes to use. Because there exist hundreds of different types of print media that the user could purchase, the user would need access to hundreds of different color profiles one for each available media when used with the user's printer. However, many printer manufacturers include drivers for their printers with the operating system so that any consumer can plug any printer into a computing device and achieve printing functionality with a minimum of effort. A number of restrictions prevent each printer manufacturer from including hundreds of color profiles for every printer the manufacturer produces with the printer driver, including cost and distribution. Even for a small printer manufacturer, the permutation of every printer they produce with all of the media available can be hundreds of thousands of color profiles. Furthermore, even if all of these color profiles were included, it is difficult for the printer manufacturer to update the profile of a given printer when a new media is introduced. Users would be forced to download new profiles every day if each manufacturer sought to perform a complete update.

Currently, printer manufacturers provide a minimum set of color profiles with drivers for their printers. This set of color profiles can be delivered to the user with a computer-readable medium, such as a CD or floppy disk, that is included with a particular printer, downloaded from the Internet, or they can be included in the operating system for the user's computing device. The printer driver is then forced to select among this minimum set to find a color profile that most closely resembles a new media which the user is seeking to use. Often complicating the process is the fact that users generally know very little about the colorimetric properties of the media they purchase, and cannot, therefore, provide appropriate input to facilitate the driver's task of identifying the optimal color profile for the given media.

Similarly, the manufacturers of print media face a similar problem in attempting to provide the user access to color profiles for many different printers when used with a particular print media. The problem is especially prevalent when a print media manufacturer develops a new advanced print media which requires a significantly different color profile when used with any printer. In such a circumstance, most users will resort to allowing the printer driver to select from among the provided color profiles, resulting in output that does not fully exploit the colorimetric properties of new print media, and thereby resulting in a poor user experience.

Together with color profiles, print media manufacturers often seek to distribute other media properties, such as templates or other similar page layout information to avoid forcing the user to set up the proper layout or other relevant options. For example, print media can contain predefined sections, such as labels, or cards, which are designed to be separated after printing. A page containing many such predefined sections cannot be easily used by an average computer user given only the controls provided by the user's favorite word processing or graphics program. Once again, without access to such other media properties, the user is unable to easily exploit the full capabilities of the print media, resulting in a poor user experience.

SUMMARY OF THE INVENTION

The present invention is directed to a method and system for obtaining print media properties, tailored for an intended printer and a given media type, on a case-by-case basis.

The present invention is likewise directed to a method and system for obtaining optimal color profiles for an intended printer and given media type while requiring minimal knowledge on the part of the user of the properties of the media.

The present invention is further directed to a transparent method and system for obtaining print media properties while requiring minimal input from the user.

Generally, when a user wishes to print, a printing interface is presented to the user allowing the user to select, among other options, the type of media upon which the user wishes to print. The present invention contemplates that the user can be presented with an option to add a new type of media, by entering a common identifier of the media, such as a product number or UPC code. Based upon the information entered by the user, a networking subsystem can connect to a remote database, such as a network server maintained by the manufacturer of the media purchased by the user, and can download properties of the media, including its physical size, layout, texture, and color characteristics. Additionally, another remote database, such as a network server maintained by the manufacturer of the printer, or the same remote database, can be consulted by the networking subsystem, to determine if a color profile for the intended printer using the particular media selected has already been created. In such a case, the previously created profile can also be downloaded.

Once relevant information about the media has been downloaded, the information can be used to present additional options to the user, and to improve the color printing accuracy of the intended printer with the current media. The printing interface, for example, can use the downloaded information about the media to automatically set appropriate print margins or other page layout properties. Additionally, the printing interface can provide the user with a printing preview image to illustrate the layout and other characteristics of the new media. Similarly, a color management subsystem can use the downloaded color profile of the intended printer with the new media to better tune the color output onto the new media. If no such color profile was found, the color management subsystem can use the downloaded properties of the new media, including the color characteristics, and can extrapolate a new color profile of the intended printer and the new media. The new color profile can then be used, providing an improvement in the color output over what the user could expect by merely using a default color profile, or attempting to edit the color profile themselves. In such a manner the user is provided with all of the advantages of the new media without the need to learn detailed information about the new media or the science of color management, and without the need to maintain an immense library of unnecessary color profiles.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
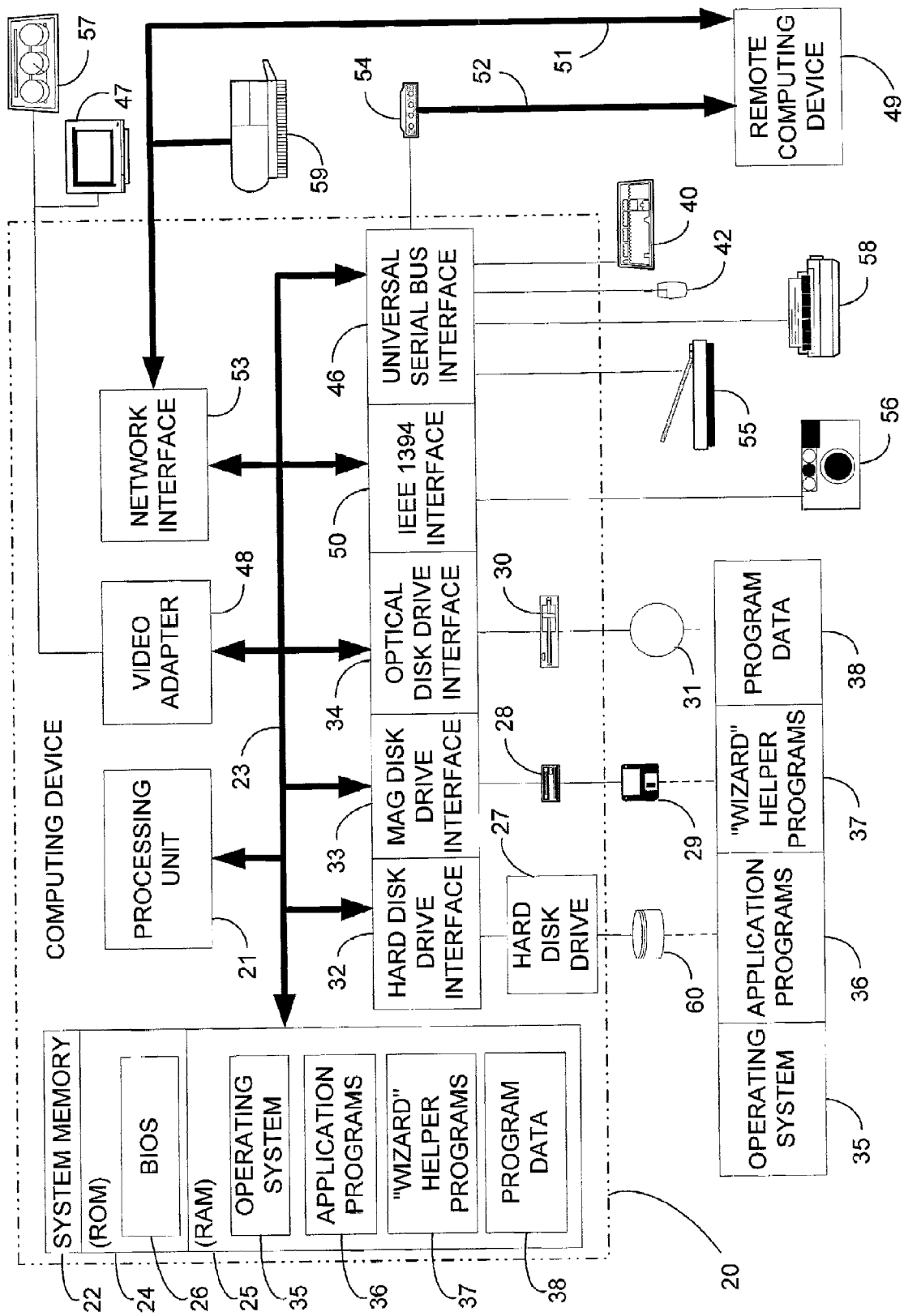
FIG. 1 is a block diagram generally illustrating an exemplary computing device and system on which the present invention resides.

The present invention is directed to a method, system, and user interface for providing accurate output from a printer onto a new media obtained by a user. The present invention contemplates downloading information from one or more remote databases to provide characteristics of the new media obtained by the user, based on the user's input of an identification of the new media or an automatic identification of the new media performed by a properly equipped printer. The characteristics can include layout and size properties, which can be used to automatically configure margins and other layout related properties. The layout and size can also be used to provide the user with a preview of the printed page, reducing wasted ink and paper. Additionally, the characteristics can include color properties of the new media, and color profiles of the intended printer when using the new media. If the color profile of the intended printer using the new media already exists, it can be used by a color management subsystem to tune the colors for accurate presentation, by the printer, onto the new media. If the color profile of the intended printer using the new media does not exist, the color management subsystem can use the color properties of the new media and color profile of a similar printer and a closely related media to extrapolate and calculate a new color profile for the intended printer using the new media. The calculated color profile can then be used to produce the accurate image desired by the user. Ultimately, only minimal effort on the part of the user is required to provide a complete setup and accurate output for the new media.

Turning to the drawings, wherein like reference numerals refer to like elements, the invention is described hereinafter in the context of a computing environment. Although it is not required for practicing the invention, the invention is described as it is implemented by computer-executable instructions, such as program modules, that are executed by a computing device. A computing device can include handheld devices, multi-processor systems, microprocessor-based or programmable consumer electronics, network computing devices, minicomputers, mainframe computers and the like. Generally, program modules include routines, programs, objects, components, data structures and the like that perform particular tasks or implement particular abstract data types.

The invention may also be practiced in distributed computing environments, where tasks are performed by remote processing devices that are linked through a communications network. In a distributed computing environment, program modules may be located in both local and remote memory storage devices.

Although the invention may be incorporated into many types of computing environments as suggested above, the following detailed description of the invention is set forth in the context of an exemplary general-purpose computing device. Before describing the invention in detail, the computing environment in which the invention operates is described in connection with FIG. 1.

A computing device 20 includes a processing unit 21, a system memory 22, and a system bus 23 that couples various system components, including the system memory, to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing device 20, such as during start-up, is stored in ROM 24. The computing device 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computing device 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, "wizard" helper programs 37, and program data 38. A user may enter commands and information into the computing device 20 through input devices such as a keyboard 40 and a pointing device 42. Additionally, the user can enter images through image capture devices, such as a scanner 55 or a digital camera 56. Other input devices (not shown) may include a microphone, joystick, game pad, satellite dish, or the like. These and other input devices are often connected to the processing unit 21 through a Universal Serial Bus (USB) interface 46 that is coupled to the system bus 23. Alternatively, higher speed connections can be used, such as an IEEE 1394 ("Firewire") interface 50, which is shown connected to the digital camera 56. The input devices can also be connected by other interfaces, such as a parallel port, serial port, or game port, which are not shown. A monitor 47, projector 57, or other type of display device can also connected to the system bus 23 via an interface, such as a video adapter 48. Additionally, hard copy output devices can also be used by the computing device 20. A local printer 58 can be connected to the processing unit 21 through the USB interface 46, or other interface, such as the parallel port (not shown). Similarly, a network printer 59 can be connected to the computing device 20 through a network interface 53. In addition to the monitor, projector, and the printers, computing devices typically include other peripheral output devices, such as speakers, which are not shown.

The computing device 20 may operate in a networked environment using logical connections to one or more remote computers, such as a remote computing device 49. The remote computing device 49 may be a server, a router, a network computing device, a peer device or other common network node, and typically includes many or all of the elements described above relative to the computing device 20. The logical connections depicted in FIG. 1 include a local area network (LAN) 51 and a wide area network (WAN) 52. Such networking environments are commonplace in offices, enterprise-wide computer networks, intranets and the Internet. Either the LAN 51 or the WAN 52 can support the network printer 59, so that the network printer can be shared between the computing device 20 and other computing devices, such as the remote computing device 49. In FIG. 1, however, the network printer 59 is only shown connected to the LAN 51.

When used in a LAN networking environment, the computing device 20 is connected to the local network 51 through the network interface or adapter 53. When used in a WAN networking environment, the computing device 20 typically includes a modem 54 or other means for establishing communications over the WAN 52. The modem 54, which may be internal or external, is connected to the system bus 23 via the USB interface 46. In a networked environment, program modules depicted relative to the computing device 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various acts and operations described hereinafter may also be implemented in hardware.

In accordance with one important aspect of the invention, a printing user interface provided by a helper application, known as a "wizard", can prompt a user to enter an identifier of a new media upon which the user wishes to print. Such an identifier can be a UPC (Universal Product Code) number, a product identification number, a stock number, or the like. Alternatively, a properly equipped printer can automatically detect an identifier of the new media upon which the user wishes to print. In combination with additional important aspects of the invention described below, the wizard can automate setup steps for a user, irrespective of the method used to determine the identification of the media. Thus, the margins within an application and the page layout can be automatically set to conform to the new media obtained by the user. Similarly, appropriate color profiles can be selected such that a color management subsystem can tune the color output of the intended printer so that an accurate color image is produced on the new media. Additionally, a common, user-friendly name can be assigned to the new media, and its characteristics can be stored in such a manner that, should the user need to reference the new media in the future, the user can simply select the new media by its user-friendly name from a list of other media types.

In accordance with another important aspect of the invention, a networking subsystem and the color management subsystem interoperate to download, create, and use information about attributes, including colorimetric and physical properties, of the new media. The networking subsystem can connect to one or more remote databases of information to attempt to locate information regarding the attributes of the new media and to attempt to determine if a color profile for the intended printer and the new media already exists. Once the sought after information is identified and downloaded, it can be passed to the wizard to be used to automatically adjust the appropriate settings for new media. The information can also be passed to the color management subsystem so that the color profile for the intended printer and the new media can be identified or created. Once the color profile has been found, it can be used by the color management subsystem to appropriately tune the output of the intended printer so that accurate color output is achieved with the new media.

Figure 2A:
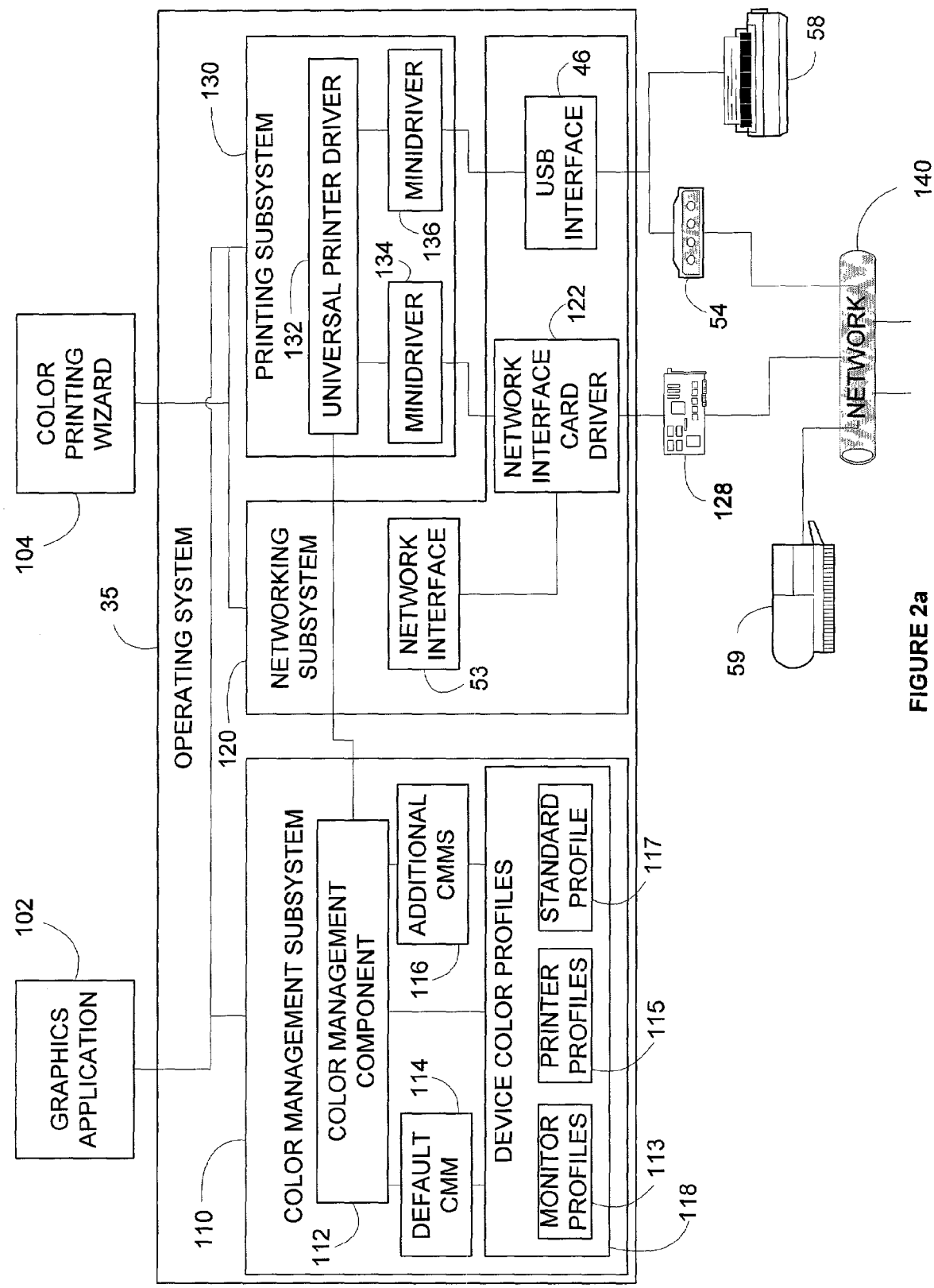
FIGS. 2a and 2b are block diagrams generally illustrating subsystems of an operating system utilized by the present invention.
Figure 2B:
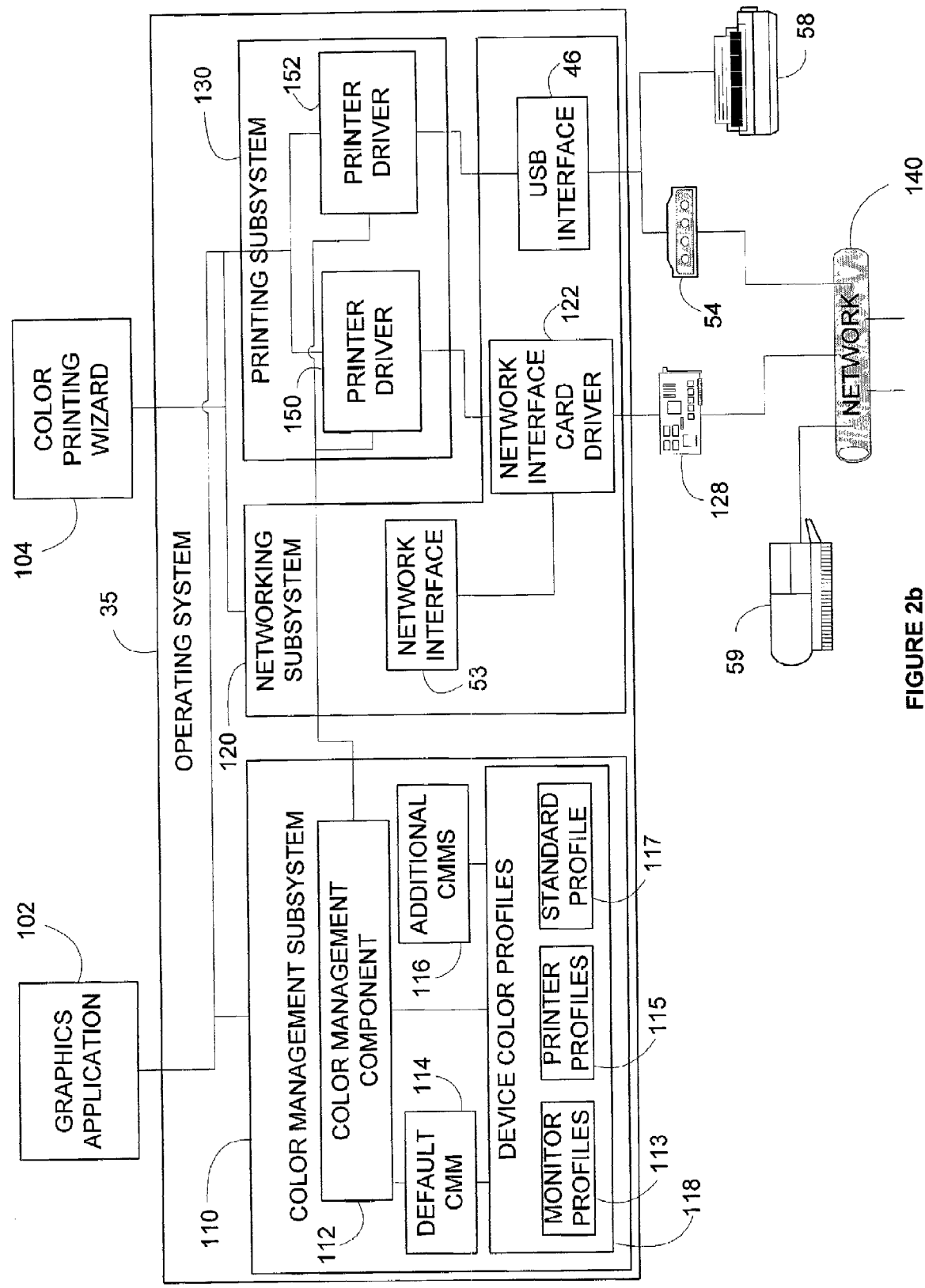

In keeping with the invention, FIGS. 2a and 2b illustrates the relationships between various components and subsystems of computing device 20 contemplated by the present invention. FIG. 2a illustrates a printing subsystem 130 containing a universal printer driver 132 and minidrivers 134 and 136, while FIG. 2b illustrates a printing subsystem 130 containing only printer drivers, such as printer driver 150 and 152. The present invention is equally applicable to computing devices using either type of printing subsystem, or other printing subsystems. For clarity, the same numbers are used to refer to the same components as used in both FIGS. 2a and 2b.

Turning to FIG. 2a, the universal printer driver 132 can contain many of the instructions and algorithms used by many printer drivers, in a manner known to those skilled in the art. A printer manufacturer., therefore, need not duplicate these common algorithms, and need only provide minidrivers which contain the algorithms and instructions that differ for each individual printer. As a result, the memory requirements of the printing subsystem 130 are greatly reduced. The minidrivers can contain printer-specific instructions and algorithms, and rely on the universal printer driver 132 for more common tasks, such as support for mainstream page description languages used by known printer manufacturers.

Conversely, FIG. 2b illustrates a printing subsystem 130 containing only printer drivers, such as printer drivers 150 and 152. The printer drivers 150 and 152 contain all of the printer specific instructions and additional information necessary to print the output of an application, such as graphics application 102.

Both FIGS. 2a and 2b illustrate the printing subsystem 130 connected to a networking subsystem 120 in order to communicate with various printers, including printers 58 and 59. For example, local printer 58 is connected to computing device 20 Networked printer 59 is generally connected to the network 140, which can either be the LAN 51 or the WAN 52 of FIG. 1. FIGS. 2a and 2b show networked printer 59 connected through a LAN connection, using a network interface card (NIC) driver 122 (which can be part of the networking subsystem 120) and a NIC 128 to connect to the network 140. In addition to connecting the printing subsystem 130 to printers 58 and 59, the networking subsystem 120, through the network interface 53, provides networking support for the color printing wizard 104, as will be described in more detail below.

Turning to the color management subsystem, which is common to both FIGS. 2a and 2b, the graphics application 102 is one of the application programs 36 of FIG. 1, and a color printing wizard 104 is one of the wizard helper programs 37 resident on computing device 20 in FIG. 1. The operating system 35 of computing device 20 contains various subsystems, including a color management subsystem 110, a networking subsystem 120, and a printing subsystem 130. The color management subsystem 110 includes a color management component 112, a default Color Management Module (CMM) 114 and additional CMMs 116. Additionally, the color management subsystem 110 contains device color profiles 118, such as monitor profiles 113, printer profiles 115, and standard (or generic) profiles 117. The color management subsystem 110 is connected to the printing subsystem 130 described above with respect to both FIGS. 2a and 2b.

A CMM provides instructions and algorithms for translating between one color profile and another, or between one color space and another. As is known by those of skill in the art, the ability of a device to reproduce color is known as the device's gamut. A gamut is defined in terms of a color universe, which is often visualized as a circle of continuously varying colors, containing the entire range of color, or, in three dimensions, as a cube with the vertices being white, black, red, green, blue, cyan, magenta and yellow. The greater the ability of a device to reproduce color, the larger its gamut, and, hence, the area under the gamut on the color map is also larger. The gamut of a device is stored in the device's color profile. A color profile provides the appropriate instructions to achieve a specific color. For example, in an 8-bit system, a profile could indicate that a particular shade of gray can be achieved by sending red, green, and blue values of 131, 122, and 119, respectively. Generally, a color profile takes the form of a header, following by a table of tags, further followed by a series of tagged elements that can be accessed individually. The table of tags can provide a table of contents for the tagging information in each profile, and can include a tag signature, the beginning address offset, and size of the data for each tagged element. Additional information regarding one type of color profile and CMM can be found in the International Color Consortium Specification ICC. 1:1998–09, which is hereby incorporated by reference in its entirety. However, the present invention can be equally applied to any other type of color profile and is in no way limited to color profiles that conform to the ICC Specification.

Thus, a CMM can provide instructions and algorithms for translating the information contained within a color profile from one color profile to another. For example, one CMM might linearly translate colors from one color space to another. Thus, if a first color profile indicated that a first output device was capable of producing a specific color, but a second color profile indicated that a second output device was not capable of producing that same color, a linear CMM might map the color to another color by simply determining the closest color that the second output device could reproduce. Another CMM, not using such a simple, linear translation, might perform further calculations and map the unreproducible color to a color that more accurately affects surrounding colors, but is not necessarily the closest color capable of being reproduced.

A CMM can also translate between one color space and another. As known by those skilled in the art, a color space can be defined by a few base colors. For example, every color on most video display equipment, such as monitor 47 or projector 57 in FIG. 1, is displayed as a combination of red, green, and blue. Known as an RGB color space, every color within the space is defined as a combination of red, green, and blue in varying intensities. Similarly, many common color printers, including ink-jet printers and color laser printers, such as printer 58 or network printer 59, reproduce color by placing varying amounts of cyan, yellow, magenta, and black onto a page. Known as a CYMK color space, every color is created as a combination of varying intensities of cyan, yellow, magenta, and black. A CMM can also provide information and algorithms for translating between two color spaces, such as between a CYMK and RGB color space. Because the perception of color by humans is very subjective, there can be many methods for translating between color spaces.

Various groups and consortiums define methods for translating between color spaces, and between color profiles. As will be appreciated by those skilled in the art, a great deal of testing and analysis is performed to determine, both mathematically and visually, what constitutes an accurate translation. Because of differences in perception, however, different translation algorithms exist, each of which may be regarded as the "best" translation by various groups of people. Similarly, the needs of particular groups of users can also influence what is considered the most accurate translation. For example, those in the printing industry, such as photographers, and magazine editors, will have differing criteria for accuracy than those in the medical imaging industry, such as doctors and surgeons. Thus, one CMM might define translation mechanisms which are more heavily weighted towards user perception of color, while another CMM might define translation mechanisms which are more heavily weighted towards maintaining the relative differences between colors in an image. The printing industry would prefer the CMM based on user perception, while the medical imaging industry might prefer the CMM based on relative differences between colors.

The default CMM 114 provides information and algorithms for the color management component 112. The color management component 112 can use the default CMM 114, or one of the additional CMMs 116, depending on the user's preferences. The color management component 112 uses a CMM to translate between color profiles and color spaces. For example, the color management component 112 can translate between a monitor color profile, which can be one of the monitor profiles 113 and a printer color profile, which can be one of the printer profiles 115; such that the printed output most closely resembles the image the user sees on the monitor 47. Generally, the difficulty in such a translation is that the printer has a significantly different gamut shape than does the monitor. Thus, colors which the monitor can output to the user may be beyond the printer's ability to reproduce. In such a case, the color management component 112 will, following the instructions and algorithms of the default CMM 114, or another CMM 116 if selected by the user, attempt to map each color in the image being displayed by the monitor into a comparable color which the printer can produce. As a result, the printed output will more closely resemble the displayed image.

The color management component 112 can also perform indirect translation and other more complex color mappings. For example, a user may want to view an image on a monitor 47, print a proof of the image on a local printer 58 with a more limited gamut, and then send the final copy to a networked print service with a high resolution printer 59. The color management component 112 can translate the colors of the image displayed on the monitor 27 into the colors that can be printed on the high-resolution printer 59 by using the monitor color profile and a high-resolution printer color profile, which can be one of the printer profiles 115. The color management component 112 can then further translate the image, as it would be printed on the high-resolution printer 59, into an image to be printed on the local printer 58 using the high-resolution printer color profile and a local printer color profile, which can also be one of the printer profiles 115. The resulting output of local printer 58 will provide the user an accurate indication of what the final, higher resolution, output will look like.

Figure 3:
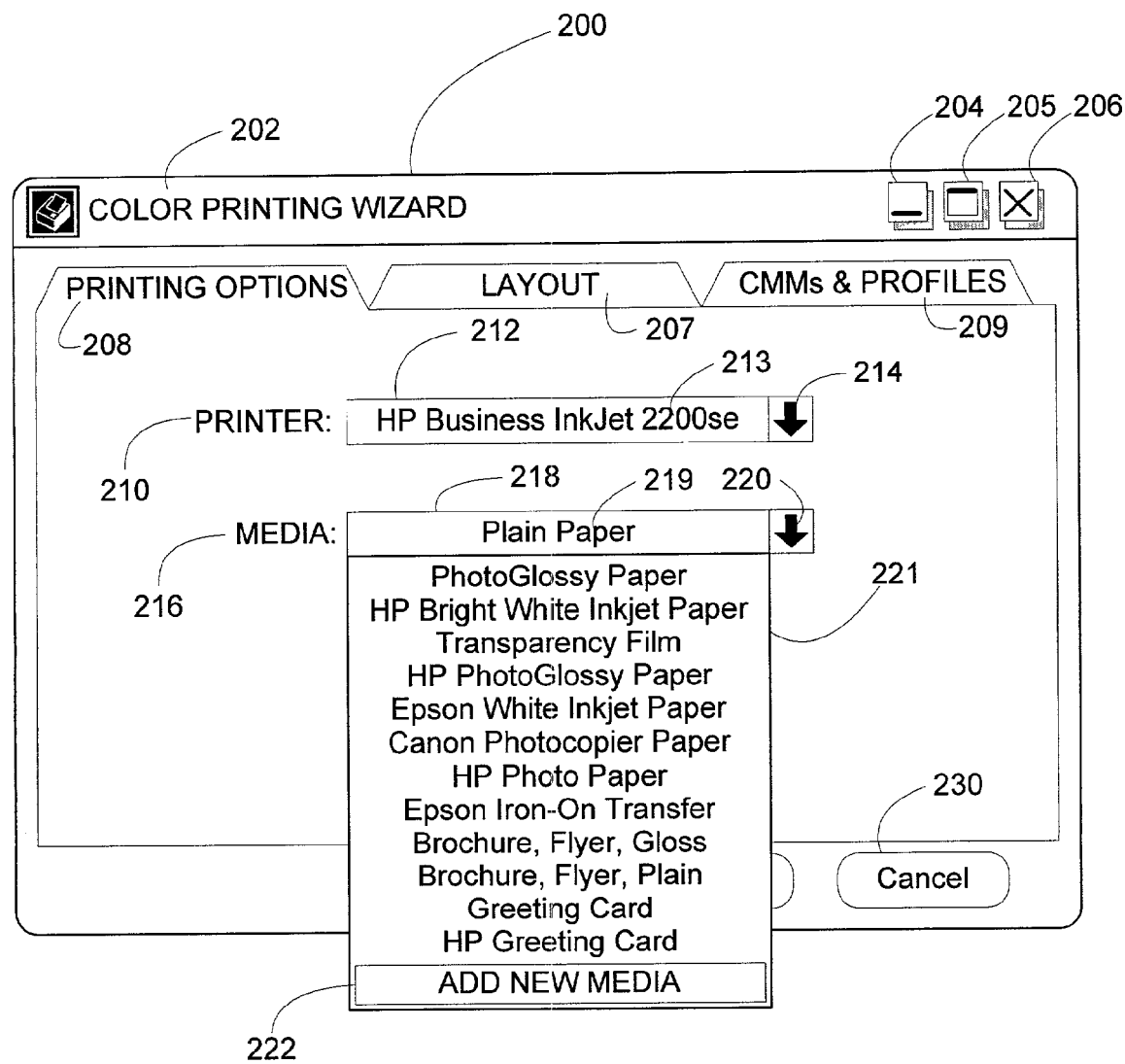
FIG. 3 is a diagram of a sample user interface contemplated by the present invention.

Turning to FIG. 3, an exemplary user interface of the color printing wizard 104 is shown as a color printing wizard window 200. The color printing wizard window 200 contains a title 202, a minimize button 204, a maximize button 205, and a close button 206. The color printing wizard window 200 can also be closed by clicking on either the "OK" button, not shown, or the "Cancel" button 230. The particular color printing wizard window 200 shown in FIG. 3 allows the user to edit the printing options, as indicated by folder tab 208. Additional functionality can be accessed through the color printing wizard window 200 by selecting other tabs, such as tabs 207 and 209, which can, respectively, provide a user interface for setting up the layout of the page, which will be described in further detail below, and changing the default CMM or the color profiles of various attached color devices. While three tabs are shown in FIG. 3 for illustrative purposes, additional tabs and functionality can also be added if desired.

The printing options tab 208 provides a printer selection 210 and a media selection 216. The printer selection 210 contains an input box 212 that can contain the name of the selected printer 213, and provides a pull-down menu through an arrow button 214 to allow the user to select from a universe of printers, such as all accessible printers, or all printers for which a driver (or a minidriver) is installed on the computing device 20. Similarly, the media selection 216 contains an input box 218 that can contain the name of a selected media 219, and provides a pull-down menu 221 through an arrow button 220. The pull-down menu 221 can offer the user a choice of known media types or can allow the user to add a new media type, as illustrated by choice 222.

Figure 4:
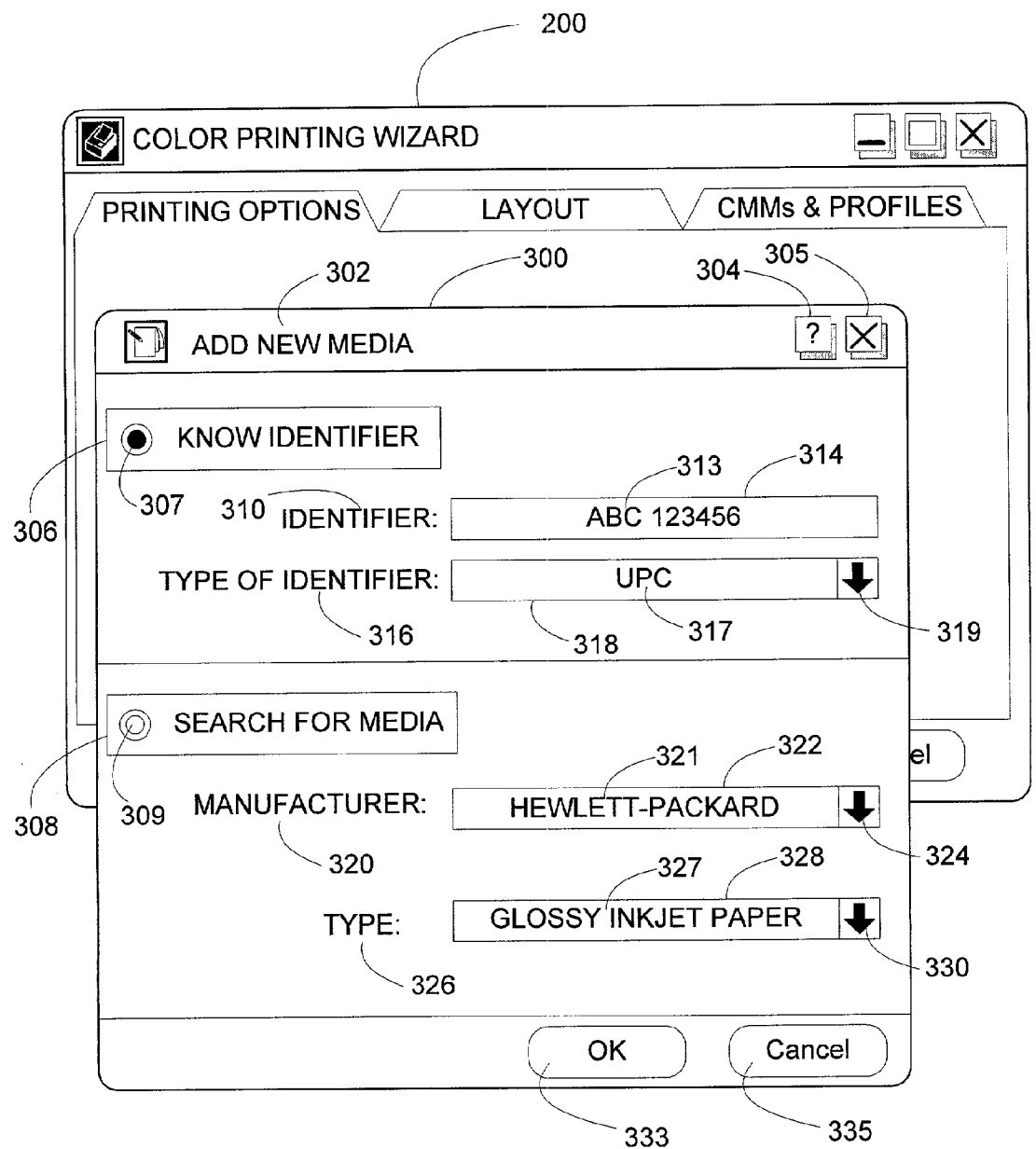
FIG. 4 is a diagram of another sample user interface contemplated by the present invention.

The present invention contemplates a simple user interface for adding new media, which accesses additional functionality to automate the process of setting up computing device 20 to use the printer 58 or 59 to print on the new media. FIG. 4 illustrates one such simple user interface, shown in add new media window 300, which can appear as a result of the user selecting choice 222 from FIG. 3. The add new media window 300, contains a title area 302, a close button 305 and a help button 304, and prompts a user to either enter an identifier, through selection 306, or to enter information to allow a search to be made to locate the appropriate media information, through selection 308. Selection 306 contains a selected radio button 307, while selection 308 contains an unselected radio button 309, indicating that the user does have an identifier which the user can enter. In addition to the close button 305 a user can also exit the add new media window 300 through the "OK" button 333 or the "Cancel" button 335, which operate in a manner known to those of skill in the art.

The add new media window 300 allows a user to input an identifier through an identifier selection 310, containing an input box 314 into which the user can input an identifier 313. The add new media window 300 also provides the user with a type of identifier selection 316, containing an input box 318 into which the user can input a type of identifier 317, or can access a pull-down menu of common types of identifiers through arrow button 319. As will be explained further below, the present invention contemplates that the user can enter any of a number of common identifiers to locate information about the new media.

If the user does not know an identifier for the new media, the add new media window 300 allows the user to enter general information about the new media which can be used to perform a search for possible identifiers. Thus, if the user selected the search for media selection 308, the user could use either a manufacturer selection 320 or a type selection 326, or both to search for an identifier of the new media. The manufacturer selection 320 contains an input box 322 into which the user can enter the name 321 of the manufacturer of the new media, or can select from common, or previously entered, manufacturer names provided by a pull-down menu access through arrow button 324. Similarly, the type selection 326 contains an input box 328 into which the user can enter the type of media 327, or can select from common, or previously entered, media types provided by a pull-down menu accessed through arrow button 330.

As an alternative, the present invention also contemplates that a properly equipped printer can detect the type of print media or an identifier of the print media without requiring the user to enter an identifier or other identification information. For example, a printer with an integrated sensor that senses a dispersed yellow pattern that can be integrated into the media could be used to determine the identifier of the print media. Such sensors are already used in color copiers as an anti-counterfeit measure. An alternative method would mark the print media with microscopic barcodes that could be read by an appropriate sensor integrated into the printer. Such barcodes have already been integrated into premium inkjet paper and are known in the art. Yet another method would leverage the density sensors already in many printers to detect gross media differences such as matte or glossy paper or bright white papers compared to media without brighteners.

Figure 5:
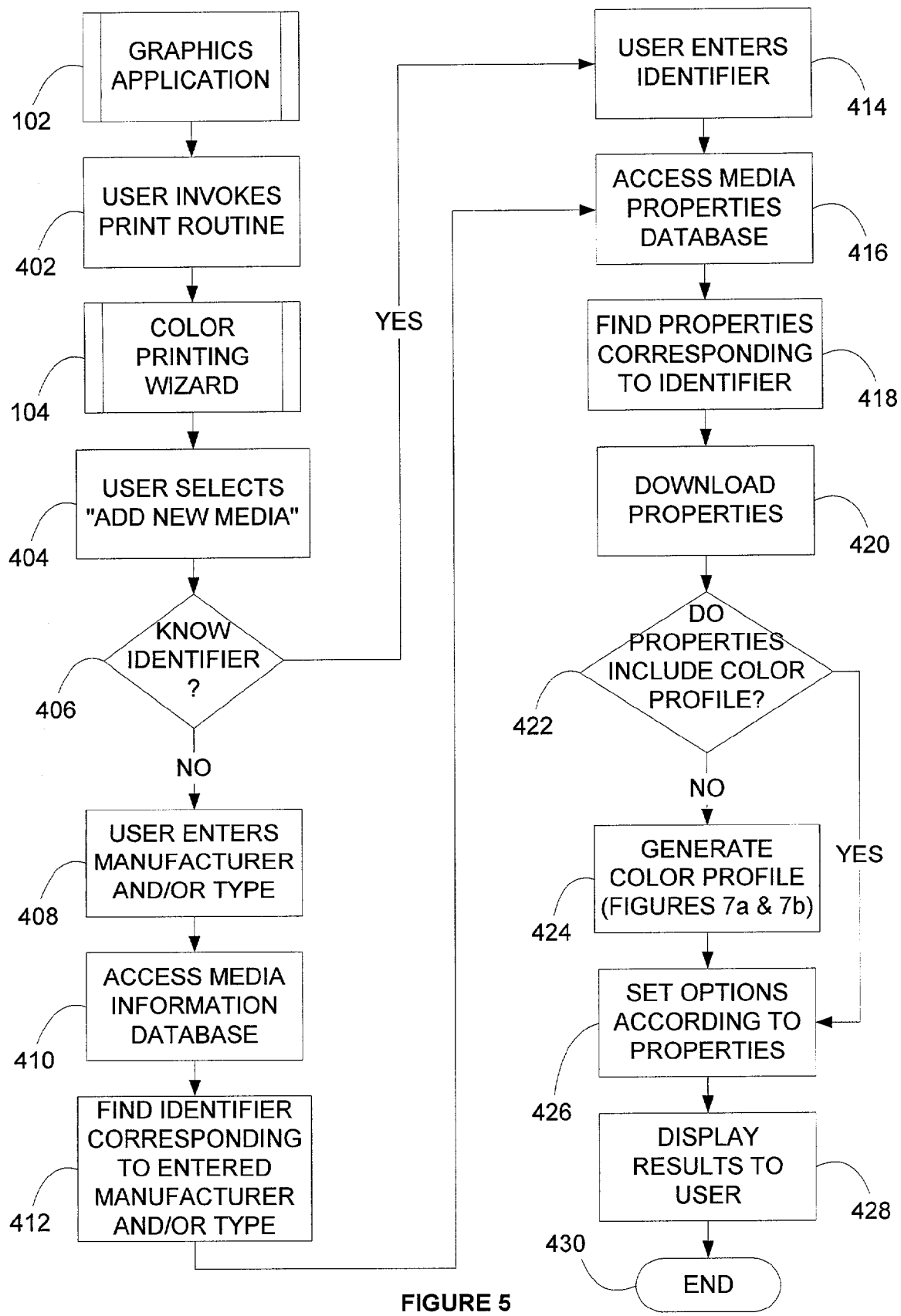
FIG. 5 is a flowchart generally illustrating the operation of one aspect of the present invention.

Once the appropriate identification information has been gathered, either through user input, or by automatic detection, the color printing wizard 104 can access the networking subsystem 120 to connect to a remote database through the network 140 and search for the necessary information and specifications of the new media. FIG. 5 is a flow chart illustrating one exemplary flow of execution contemplated by the present invention. Initially, the user invokes a print routine at step 402 from a graphics application 102, and, as a result, the color printing wizard 104 is invoked. At step 404 the user selects the "add new media" option 222 from pull-down menu 221, as shown in FIG. 3. Step 406 allows the user to select the "know identifier" option 306 or the "search for media" option 308, as shown in FIG. 4. If the user knows the identifier, they can enter it at step 414. If the identifier is not known, additional steps can be performed to locate an identifier. As shown in FIG. 4, the user can enter the name of the manufacturer 321 of the new media, the type 327 of the new media, or both. Based on this information, the color printing wizard 104 can use the networking subsystem 120 to connect to a remote database through the network 140 and search for additional information to aid the user in determining the identifier.

Step 410 of FIG. 5 contemplates a media information database located on network 140. Network 140 can be either a LAN 51 or a WAN 52, such as the Internet. The media information database can be maintained by any number of providers. For example, each media manufacturer can maintain a manufacturer-specific media information database, such that, if the user enters the manufacturer of the media at step 408, the color printing wizard 104 need only access the media information database maintained by the manufacturer entered by the user. However, if the user only enters the media type 327, the color printing wizard 104 may need to search each known manufacturer's media information database to locate all of the media whose type matches the type 327 entered by the user. Alternatively, a remote media information database can be maintained by a third-party such as an operating system manufacturer, an office supply company, or a specialized enterprise dedicated to this task. With the remote media information database, the color printing wizard 104 need only connect to and search a single database regardless of the information entered by the user.

The present invention contemplates that the media information database can contain various information regarding each media product available, including the manufacturer's name, the type of media, and an identifier of the media, such as a product number or UPC number. The database can be arranged in simple tabular format, or an alternative format for more efficient searching. Because a single manufacturer may produce hundreds of different types of media, and because a single media type may be produced by dozens of different manufacturers, additional information can be contained in the media information database to aid the user in identifying the new media they seek to use. For example, the database may also contain a common name for the media, a description of the media, an image of the cover of the container in which the new media can be purchased, or like information to aid the user in identifying the new media. Thus, if the user merely provided a manufacturer name 321, the color printing wizard can return to the user a list of all media located by the manufacturer name search, together with their common names, descriptions, or images of the cover. The user can then select from among these options to identify the new media. Step 412 in FIG. 5 contemplates either a single search by the color printing wizard 104, resulting in a single media, or multiple searches in which the color printing wizard returns information to the user, such as described above, to further narrow down and eventually identify the new media. Once the new media is identified at step 412, the color printing wizard can access a media properties database at step 416. The color printing wizard 104 can also access the media properties database at step 416 if the user provides an identifier at step 414.

The media properties database accessed at step 414 can be the same database as the media information database accessed at step 410, or it can be a separate database. As a separate database, the present invention contemplates that the media properties database can contain various physical and colorimetric properties of the media to aid the color printing wizard in automatically setting up computing device 20 for optimum color printing. Each entry contained within the media properties database can be referenced by an identification number. Because the color printing wizard 104 allows the user to enter various types of identification numbers, the entries within the media properties database can contain multiple identifiers for each media entry. For example, a media entry can have a UPC number, a product number, a catalog number, and any other applicable identifiers. In such a manner the media properties database can be searched by the color printing wizard 104 using any of those identifiers.

In addition to the identifiers, the media properties database can contain physical and colorimetric properties of the media. For example, the media properties database can contain physical properties such as the length and width of the media, the length, width, and locations of subsections of the media, such as multiple label tabs on a single sheet, default and minimum printing margins of the sheet and any subsections on the sheet, and other like information. Similarly, the media properties database can contain colorimetric properties, such as the absolute black value, the absolute white value, tone curves for cyan, yellow, magenta, black, and any other base color used by the printer, a measure of the gloss of the media, and other like properties. Additionally, if the media properties database contains a color profile of the media with a given printer, then that profile, or a pointer to the profile, can be contained within the entry for the media. The color profiles can be arranged by printer name, by printer type, or similar arrangement.

If the media properties database is the same database as the media information database, then the descriptive information contained within the media information database, used to aid the user in determining the identifier, can be combined with the physical and colorimetric properties discussed above into a single entry for each media. As before, the database can be in tabular form, or any other form for more efficient searching. If the media properties database is not the same database as the media information database, then the media properties database can similarly be maintained by individual media manufacturers, or a central repository, such as those listed above. For example, different manufacturers might find it efficient to maintain their own media properties databases to more quickly provide updates as new media products are made available to consumers, and further colorimetric testing is performed on those products. On the other hand, office supply companies might find it efficient to maintain a media information database to provide service to customers who have purchased the new media from the office supply company. Alternatively a central repository, such as that run by an operating system manufacturer or dedicated enterprise, may provide a combined media information database and media properties database to a provide a single access point for the color printing wizard 104.

Once the color printing wizard 104 has accessed the media properties database at step 416, it can find the properties corresponding to the identifier at step 418 and download those properties at step 420. If, at step 422, the properties contain a color profile for the media and the intended printer which will be used, the color printing wizard 104 can set printing options according to the properties downloaded, and can specify the color profile downloaded at step 426. The color printing wizard can display the results of the automatic setup to the user at step 428, prior to ending the automatic setup at step 430.

Figure 6:
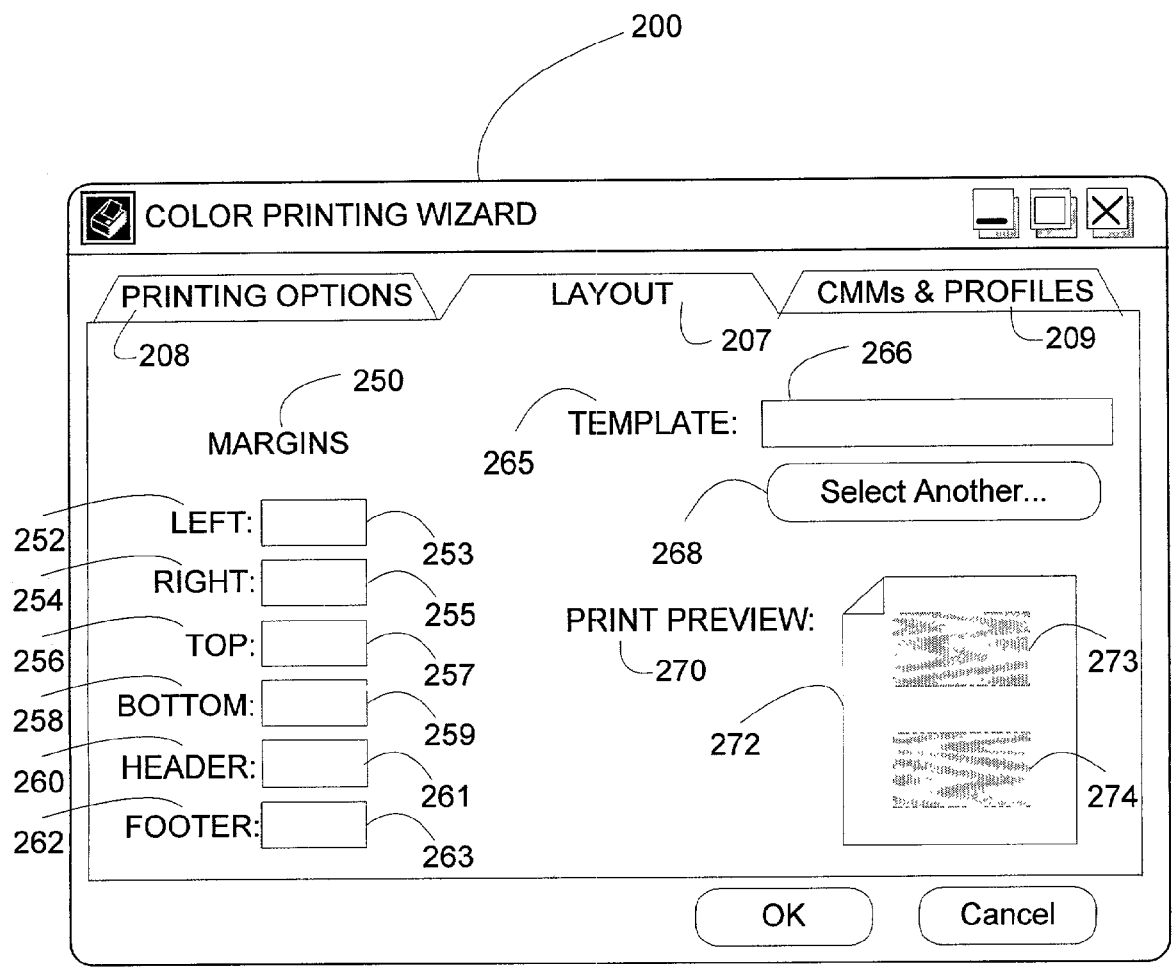
FIG. 6 is a diagram of another view of the sample user interface from FIG. 3, contemplated by the present invention.

The physical properties downloaded at step 420 can be used by the color printing wizard 104 to set layout information, such as might be accessed through tab 207 of FIG. 3. FIG. 6 illustrates an exemplary user interface accessed by tab 207. A margins section 250 can contain the left, right, top, bottom, header, and footer margins 252, 254, 256, 258, 260, and 262, respectively. The value of these margins can be displayed in the entry boxes 253, 255, 257, 259, 261, and 263, respectively, or it can be entered manually by the user through those same entry boxes. Additionally, tab 207 can provide access to a template selection 265, which can be displayed in entry box 266, or entered manually by the user therein. Alternatively, the user can select another template through template selection button 268. A print preview feature 272 can illustrate an exemplary printed page 272 containing the images 273 and 274 the user wishes to print so that the user can receive a visual indication of the layout properties.

The color printing wizard 104 can automatically set the properties of FIG. 6 using the properties downloaded at step 420 in FIG. 5. For example, the margin 10 information can be entered by the color printing wizard directly into the appropriate entry boxes 253, 255, 257, 259, 261, and 263. Additional information, such as the size and location of subsections of the media can be entered into a custom template file, which can then be entered into the template entry box 266. Alternative methods can also be used, depending on the exact form of the user interface and the amount of control the user wishes the color printing wizard 104 to exert. For example, the template information can be utilized by the color printing wizard 104 internally to render the images which will be printed, rather than creating a template file.

Returning to FIG. 5, step 426 can set the appropriate color profile to use. If an appropriate color profile was downloaded at step 420, then that profile can be selected and the results displayed to the user through a user interface accessible through tab 209 in FIG. 3, for example. However, if no appropriate color profile was found, the present invention contemplates a method and system for deriving a color profile based on the colorimetric information downloaded, and on similar color profiles, either resident locally on computing device 20, or on the network 140, such as at the media properties database.

Figure 7A:
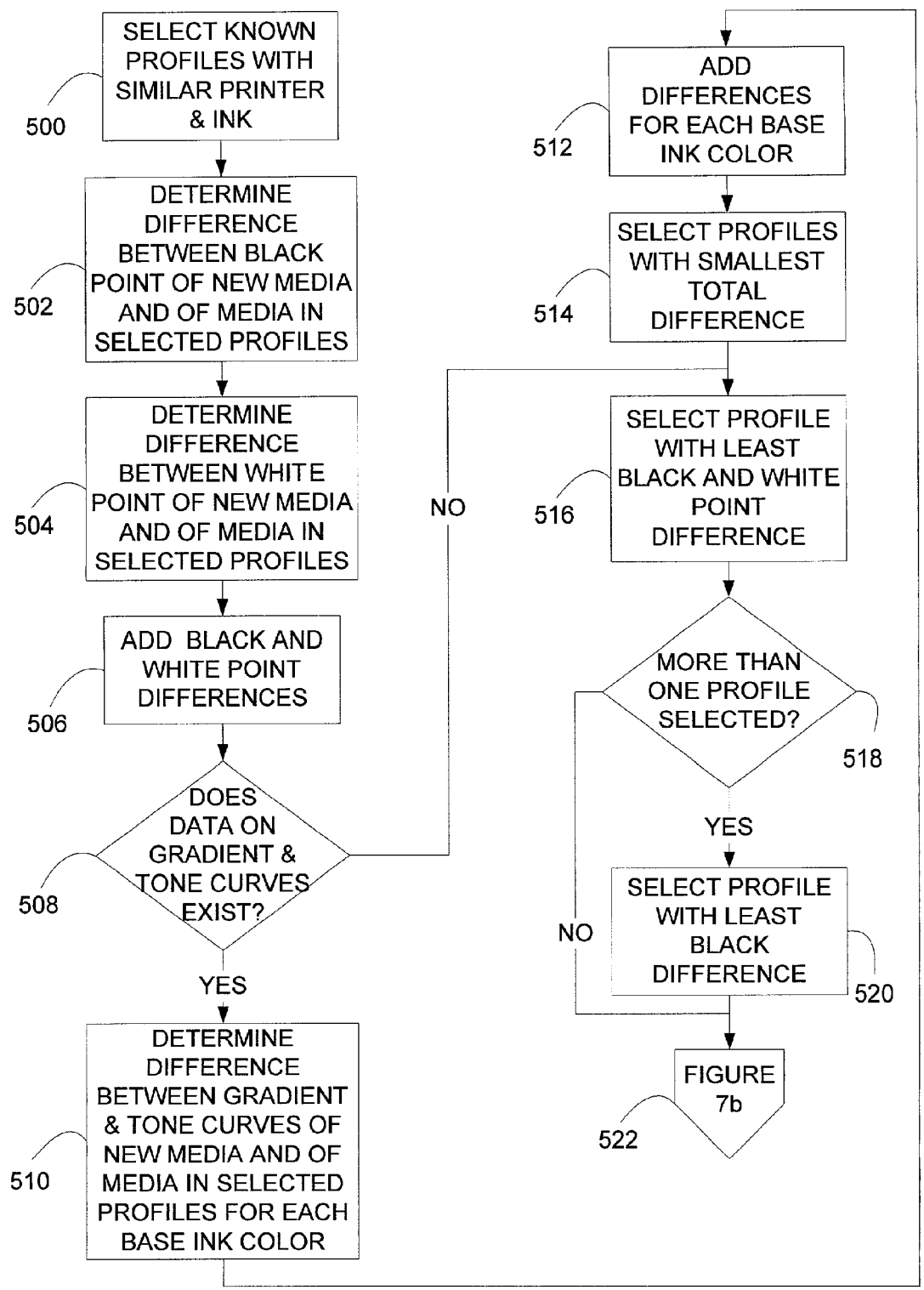
FIGS. 7a and 7b are a flowchart generally illustrating the operation of another aspect of the present invention.

Turning to FIG. 7a, a flow of an exemplary execution for deriving a new color profile is shown. If the color printing wizard 104 required a color profile to be generated at step 424 in FIG. 5, then the color printing wizard can request that the color management component 112 generate a new color profile. At step 500 in FIG. 7a, the color management component 112 searches for known profiles of a similar printer and ink as the intended printer and ink which the user intends to use with the new media. As is known by those skilled in the art, a color profile for a printer is dependent upon the printer's characteristics combined with the characteristics of the media used. Thus, at step 500, the color management component 112 searches for the printer component of known profiles. Once a set of known profiles using the same printer and ink has been identified, the color management component 112 can, at step 502, determine the difference between a black point of the new media and a black point of the media used in the selected profiles. Similarly, at step 504, the color management component 112 can determine the difference between a white point of the new media and a white point of the media used in the selected profiles. As will be known by those of skill in the art, the black point of a media is the amount of reflectivity from a black area printed onto the media. Similarly, the white point of a media is the amount of reflectivity from a white area of the media. The present invention contemplates that the media properties database will include the black and white points as part of the colorimetric properties of the media stored within the media properties database.

Once the differences of the black and the white points have been calculated, their sum can be computed at step 506. If the colorimetric properties of the media stored within the media properties database do not include data on gradient and tone curves, as checked at step 508, then the profile with the least difference between the black and white points of the media of the profile and the black and white points of the new media is selected at step 516. If there is a tie for the least difference at step 518, then the profile with the least black difference is selected at step 520. Alternatively, the black point difference can simply be weighted more when calculating the sum of the differences. For example, the difference in the black point can be multiplied by a weighting factor, such as 2 or 1.5, and then the profile with the least difference between the black and white points of the media of the profile and the black and white points of the new media can be selected at step 516.

However, if, at step 508, it is determined that data regarding gradient and tone curves is stored within the media properties database, then, at step 510, the color management component 512 can determine the differences between the gradient and tone curves for each of the base ink colors used by the intended printer which will print on the new medium. By determining the difference of the gradients and tone curves for each base color between the known media of the color profile and the new media, the color management component 112 is able to more accurately derive a new color profile, as will be described further below. The gradient and tone curves for each ink color measure how the ink is absorbed and built up on the medium. As will be known by one of skill in the art, a gradient typically refers to the color differences between hues, such as red and green. A tone curve is generally the color difference between black and white or white and pure red. As described above, the color gamut can be visualized using a cube with the vertices being white, black, red, green, blue, cyan, magenta and yellow. In such a visualization, the tone curves are the lines that have white as one end point and gradients are the lines that do not have white as either end point. Some media have linear tone curves, indicating that perceived color saturation increases linearly with respect to the actual ink density. Other media have non-linear tone curves, indicating that the perceived color saturation does not add linearly with respect to the actual ink density, generally resulting in decreasing visual difference despite an increasing amount of ink on the media.

Because tone curves are the steps in color between any vertex of the color gamut and white, and gradients are the remaining connections between vertices, one can, by measuring tone curves and gradients, reasonably represent the difference between the colorimetric properties of the known media and the new media. Thus, at step 512, the differences of the gradients and tone curves for each base color between the known media of the color profile and the new media are summed, and, at step 514, a smaller subset of the color profiles is selected; specifically, those with the smallest total difference as computed at step 512. Then, the selection at step 516, and 520 if necessary, can be more precise.

Figure 7B:
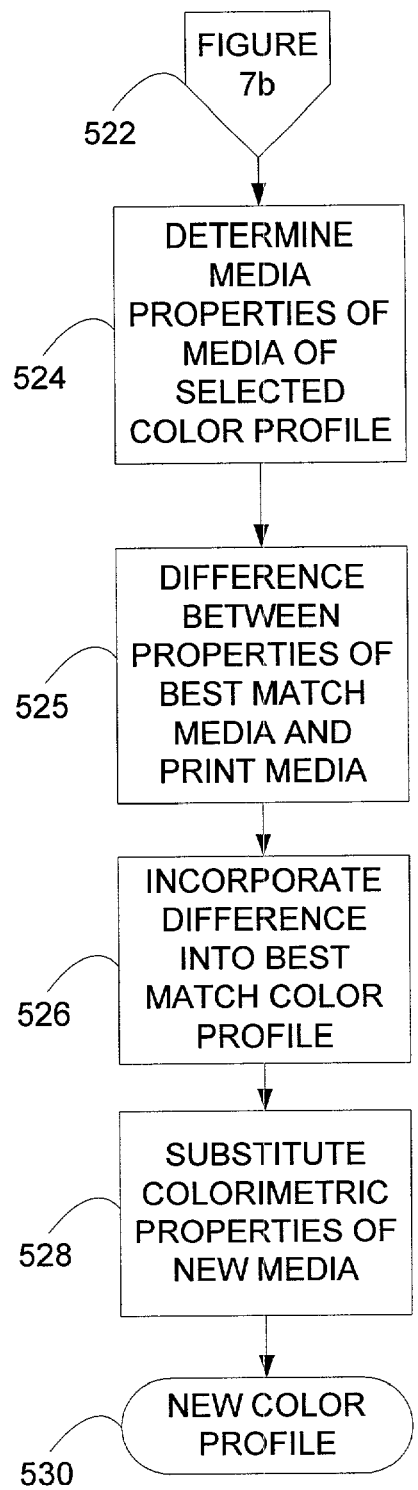

Turning to FIG. 7b, once a best match for a color profile of a printer in combination with a known media is selected, the color management component 112 can derive a new color profile for the intended printer the user wishes to use and the new media. At step 524, the color management component 112 determines the properties of the media used in the selected best match color profile. At step 525, a difference is calculated between the properties of the media used in the selected best match color profile and the properties of the new print media the user seeks to use. At step 526 that difference is incorporated into the best match color profile, in effect translating the best match color profile into a derived new color profile, and at step 528 the derivation is completed by substituting the colorimetric properties of the new media. Thus, at step 530, the new color profile has been derived.

One method for performing the translation and substitution of steps 526 and 528 is to use a multidimensional difference vector set. Given a white point, black point, tone and gradient difference between the best match media used to create the selected best match color profile and the new media, one can generate a multidimensional difference vector set. In a color profile conforming to the ICC Specification, incorporated by reference above, the white point, black point, tone and gradient information can be found in the mediaBlackPointTag, mediaWhitepointTag and charTargetTag, respectively, in the color profile header. The difference vector is, therefore, the multidimensional vector of the difference between the values stored in the above tags in the best match color profile and the known values of the white point, black point, and tone and gradient curves (if any) of the new media obtained from the media information database. This difference vector set can then be interpolated and extrapolated to match the dimensions of the lookup table tags of the best match color profile. In a color profile conforming to the ICC Specification, the lookup table tags are AToB0Tag, AToB1 Tag, AToB2Tag, BToA0Tag, BToA1Tag and BTOA2Tag, and are the 3 or 4 dimensional lookup tables relating colors from a selected printer and media combination to the colors in an ICC profile connection space. The difference vector set calculated above can then be added to the lookup table tags of the best match color profile to translate to a new profile of the same dimensions. The header of the new color profile can be replaced with known values of the new media obtained from the media information database, resulting in the complete, derived new color profile. For example, in a color profile conforming to the ICC Specification, the white point, black point, tone and gradient information of the new media, obtained from the media information database, can be used as the values for the mediaBlackPointTag, mediaWhitePointTag and media attributes field, respectively, replacing the previous values. As is known by those skilled in the art, the tags in a color profile conforming to the ICC Specification contain actual measurement values, and not differences. The above process, however, is not limited to profiles conforming to the ICC Specification, and can be used with any number of methodologies of creating color profiles. With the above process, only the differences in media are modified and the other considerations that go into creating a profile are maintained to take advantage of the similarity between the best match media and the new media the user wishes to use.

An alternative method for performing the translation and substitution of steps 526 and 528 would be to use a non-linear model such that multiplication factors or combinatorials could be used to translate between the known best match color profile and the new derived color profile. The essential function of steps 526 and 528 of FIG. 7*b* is to translate those elements of the color profile that need to be changed, replace the absolute elements with the known colorimetric properties of the new media and leave unchanged those elements that are shared between the known best match color profile and the derived new color profile.

As will be apparent to one of skill in the art, the removal and substitution of the properties of the media used in a color profile is an approximation, as the relationships between media are, generally, non-linear. For example, a media with a black point equal to half that of the black point of another media will, generally, not produce 50% dimmer colors or 50% darker colors. However, because the color management component 112 determines the closest color profile prior to any addition or subtraction of the colorimetric properties of media, the non-linear variances do not impact the resulting color profile to a great degree. Once the color profile has been derived, the color printing wizard 104 can set the profile and, using the color management subsystem 110, accurately reproduce images on the new media using the intended printer.

As can be seen, the present invention contemplates a system, method, and user interface for automating the setup of new media. One or more remote databases containing physical and colorimetric properties of media can be accessed to locate and download the properties of a new media which the user seeks to use. An automated helper program can set up the appropriate physical template while aiding a color management component in identifying or deriving an appropriate color profile to ensure accurate color output.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of setting a printing parameter for a first print medium, comprising:
    obtaining an identifier of the first print medium;
    locating a remote database containing the identifier of the first print medium, a first print medium black point and a first print medium white point;
    downloading the first print medium black point and the first print medium white point
    locating an existing color profile in the remote database, the existing color profile being based on a second print medium and a printer that is similar to an intended printer;
    determining a black point difference between a second print medium black point of the second print medium and the first print medium black point;
    determining a white point difference between a second print medium white point of the second print medium and the first print medium white point;
    determining a total difference between the second print medium and the first print medium by adding the black point difference and the white point difference;
    selecting the existing color profile to be a best match color profile based on the total difference;
    calculating a translated color profile by translating a best match print medium black point and a best match print medium white point of a best match print medium of the best match color profile; and
    calculating a new color profile by replacing the best match print medium black point with the first print medium black point, and replacing the best match print medium white point with the first print medium white point.

2. The method of claim 1 wherein the obtaining the identifier is performed by a printer.

3. The method of claim 1 wherein the obtaining the identifier includes obtaining a type of the identifier.

4. The method of claim 1 wherein the selecting the existing color profile is further based on the black point difference.

5. The method of claim 1 wherein the determining the total difference further comprises weighting the black point difference greater than the white point difference.

6. The method of claim 1, wherein:
    the remote database further comprises a first print medium tone curve;
    the method further comprises determining a tone curve difference between a second print medium tone curve of the second print medium and the first print medium tone curve; and
    the selecting the existing color profile is further based on the tone curve difference.

7. The method of claim 6, wherein:
    the first print medium tone curve further comprises a first print medium base color tone curve; and
    the tone curve difference is a sum of base color tone curve differences of each base color of the intended printer, the base color tone curve differences being between a second print medium base color tone curve of the second print medium and the first print medium base color tone curve.

8. The method of claim 1, wherein the calculating a translated color profile further comprises:
    calculating a difference vector between the best match print medium black point and the first print medium black point, and between the best match print medium white point and the first print medium white point;
    interpolating and extrapolating the difference vector to a dimension of a lookup table tag of the best match color profile; and
    adding the interpolated and extrapolated difference vector to the lookup table tag of the best match color profile.

9. One or more computer-readable media having executable instructions stored thereon that, when executed, implement the following method for deriving a new color profile for a first print medium used in an intended printer:

locating an existing color profile, wherein the existing color profile is based on a second print medium and a second printer that is similar to the intended printer;

determining a black point difference between a second print medium black point of the second print medium and a first print medium black point of the first print medium;

determining a white point difference between a second print medium white point of the second print medium and a first print medium white point of the first print medium;

determining a total difference between the second print medium and the first print medium by adding the black point difference and the white point difference;

selecting the existing color profile to be a best match color profile based on selection factors that include the total difference between the second print medium and the first print medium;

calculating a translated color profile by translating a property of a best match print medium of the best match color profile; and calculating the new color profile by replacing a property of the best match print medium with a property of the first print medium.

10. The computer-readable medium of claim 9 wherein the step of determining the total difference further comprises weighting the black point difference greater than the white point difference.

11. The computer-readable medium of claim 9, further comprising determining a tone curve difference between a second print medium tone curve of the second print medium and a first print medium tone curve of the first print medium, and wherein the selection factors further include the tone curve difference.

12. The computer-readable medium of claim 11 wherein the tone curve difference is a sum of base color tone curve differences of each base color of the intended printer, the base color tone curve difference being between a second print medium base color tone curve of the second print medium and a first print medium base color tone curve of the first print medium.

13. The computer-readable medium of claim 9, wherein the calculating a translated color profile further comprises:

calculating a difference vector that is a difference between the property of the best match print medium and the property of the first print medium;

interpolating and extrapolating the difference vector to a dimension of a lookup table tag of the best match color profile; and adding the interpolated and extrapolated difference vector to the lookup table tag of the best match color profile.

14. The computer-readable medium of claim 9, wherein the locating the existing color profile further comprises searching a database of print media and print media properties corresponding thereto.

15. A system for setting a printing parameter for a first print medium, the system comprising:

a database that stores an identifier of the first print medium, a first print medium black point and a first print medium white point and a computer-readable medium comprising computer-executable instructions that, when executed, implement the following steps:

obtaining an identifier of the first print medium;

locating the database;

downloading the first print medium black point and the first print medium white point; and locating an existing color profile in the database, the existing color profile being based on a second print medium and a second printer that is similar to the intended printer;

determining a black point difference between a second print medium black point of the second print medium and a first print medium black point of the first print medium;

determining a white point difference between a second print medium white point of the second print medium and a first print medium white point of the first print medium;

determining a total difference between the second print medium and the first print medium by adding the block point difference to the white point difference;

selecting the existing color profile to be a best match color profile based on selection factors that include the total difference between the second print medium and the first print medium;

calculating a translated color profile by translating a property of a best match print medium of the best match color profile; and calculating a new color profile by replacing a property of the best match print medium with the property of the first print medium.

16. The system of claim 15 further comprising a printer, wherein the printer further comprises a sensor for obtaining the identifier of the first print medium.

17. The system of claim 15 wherein the obtaining the identifier includes obtaining a type of the identifier.

18. The system of claim 15 wherein the determining the total difference further comprises weighting the black point difference greater than the white point difference.

19. The system of claim 15 further comprising determining a tone curve difference between a second print medium tone curve of the second print medium and a first print medium tone curve of the first print medium, and wherein the selection factors further include the tone curve difference.

20. The system of claim 15 wherein the tone curve difference is a sum of a base color tone curve differences of each base color of the intended printer, the base color tone curve difference being between a second print medium base color tone curve of the second print medium and a first print medium base color tone curve of the first print medium.

21. The system of claim 15, wherein the calculating a translated color profile further comprises:

calculating a difference vector that is a difference between the property of the best match print medium and the property of the first print medium;

interpolating and extrapolating the difference vector to a dimension of a lookup table tag of the best match color profile; and adding the interpolated and extrapolated difference vector to the lookup table tag of the best match color profile.

* * * * *